US005555359A

United States Patent [19]
Choi et al.

[11] Patent Number: 5,555,359
[45] Date of Patent: Sep. 10, 1996

[54] COMPUTER GRAPHICS ANTI-ALIASING METHOD USING A PARTITIONED LOOK-UP TABLE

[75] Inventors: Sang-gil Choi; Jun-hyoung Cho; Young-cheul Wee, all of Suwon, Rep. of Korea

[73] Assignee: Samsung Electronics Co., Ltd., Suwon, Rep. of Korea

[21] Appl. No.: 348,130

[22] Filed: Nov. 28, 1994

[30] Foreign Application Priority Data

Nov. 30, 1993 [KR] Rep. of Korea .................. 93-25929

[51] Int. Cl.$^6$ ........................................... G06T 5/00
[52] U.S. Cl. ........................ 395/141; 395/133; 395/126
[58] Field of Search ........................ 395/141, 126–132, 395/133, 135, 143, 162, 163

[56] References Cited

U.S. PATENT DOCUMENTS 4,773,515  10/1989  Dickson et al. ................. 395/143

OTHER PUBLICATIONS

Schilling, A., et al., "A New Simple and Efficient Antialiasing with Subpixel Masks", *Computer Graphics*, vol. 25, No. 4, Jul. 1991.

*Primary Examiner*—Almis R. Jankus
*Attorney, Agent, or Firm*—Rothwell, Figg, Ernst & Kurz, P.C.

[57] ABSTRACT

An anti-aliasing method greatly reduces the required size of the look-up table (LUT) memory space. The LUT memory is divided into four partitions and the four partitions are partitioned in parallel. This method allows for a great reduction in the amount of memory which needs to be incorporated into an application-specific integrated circuit (ASIC) which results in lower costs.

5 Claims, 3 Drawing Sheets

COMPUTER GRAPHICS ANTI-ALIASING METHOD USING A PARTITIONED LOOK-UP TABLE

BACKGROUND OF THE INVENTION

The present invention relates to an anti-aliasing method using a partitioned look-up table (LUT), and more particularly, to a method by which the size of the LUT used in obtaining a mask for sub-pixels is reduced to one-sixteenth of the conventional size.

In computer graphics systems, a stepped edge of an object polygon may often be generated by the digitization of an on-screen image. The removal of such a phenomenon is called anti-aliasing.

Anti-aliasing is classified into a super-sampling method and an area sampling method. In the super-sampling method, the color value of a pixel is calculated by obtaining the color values of several sub-pixels within the pixel and averaging the thus-obtained color values. In area sampling, the area of the polygon occupying a pixel is calculated and then the color value of the area ratio is calculated.

In the case of performing anti-aliasing via hardware, the super-sampling method is widely adopted due to the ease of its implementation. However, the Schilling scheme, in which area sampling is supplemented, has been proposed to solve the drawbacks of super-sampling.

In the Schilling scheme, the distance from the center of a pixel to the edge of a polygon, and the slope of the edge are input to an LUT, and the sub-pixel mask generated for that case is obtained from an LUT. Thereafter, a color value in a corresponding frame buffer and a Z value are updated with respect to the sub-pixels which are set to "1."

The sub-pixels are numbered correspondingly to the area covered by a polygon and stored in tie LUT as a sub-pixel mask having the most similar shape of the polygon within a pixel, based on the above distance and slope. Here, the distance from the center of the respective pixel to the edge of the polygon is obtained by interpolating an edge function (see "A New Simple and Efficient Antialiasing with Sub-pixel Masks" by Andreas Schilling, *Computer Graphics*, Volume 25, Number 4, July 1991, pp 133–141).

FIG. 1A shows screen units and the edge of a polygon used in the present invention. The screen units shown in FIG. 1A are pixel 100 and sub-pixels 102. In the present invention, it is assumed that a pixel is composed of 4×4 sub-pixels.

FIG. 1A also shows the distance (d) from the center of pixel 100 to a straight line of the polygon's edge, and the slope (s) of the straight line with respect to the X axis. An LUT is constituted using these two variables, thereby producing a sub-pixel mask for generating a desired screen display.

Referring to FIG. 1B which is a schematic block diagram of the conventional LUT for generating a pixel mask, the inputs of LUT 104 are d, $d_{ex}$ and the sign of $d_{ey}$. Here, $d_{ex}$ is a variable representing the distance from the center of a pixel to the straight line of the polygon's edge, which depends on the increment of the X axis. Since the magnitude of $d_{ex}$ is proportionate to the slope of a straight line of the polygon's edge, the $d_{ex}$ functions as a slope value. The sign of $d_{ey}$ determines whether a pixel location will fall inside or outside the polygon. In other words, a positive $d_{ey}$ value means that the pixel lies in the positive direction from the straight line and a negative $d_{ey}$ value means that the pixel lies in the negative direction from the straight line, with respect to the Y axis.

Therefore, LUT 104 selects a mask corresponding to three input variables and outputs the selected mask, to thereby display the mask on a screen as shown in FIG. 1C.

The anti-aliasing method of Schilling requires a 32K-bit LUT memory, supposing one pixel is composed of 4×4 sub-pixels. In order to process at high speed, the LUTs should be incorporated in a rasterizer chip. However, it is costly to incorporate such large-capacity memories into an application-specific integrated circuit (ASIC).

SUMMARY OF THE INVENTION

Therefore, it is an object of the present invention to provide an anti-aliasing method using a partitioned LUT, in order to reduce the memory amount required for constituting the LUT for performing anti-aliasing.

To accomplish the above object, an anti-aliasing method using partitioned LUTs comprises the steps of: dividing a pixel into four sub-blocks; obtaining each sub-pixel distance from the centers of the four sub-blocks to a straight line of the edge of a predetermined polygon, using a pixel distance from the center of the pixel to the straight line and the slope of the straight line; and respectively generating sub-masks corresponding to picture data of the respective sub-blocks by inputting the respective sub-pixel distances and the slope to the four LUTs.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1A:
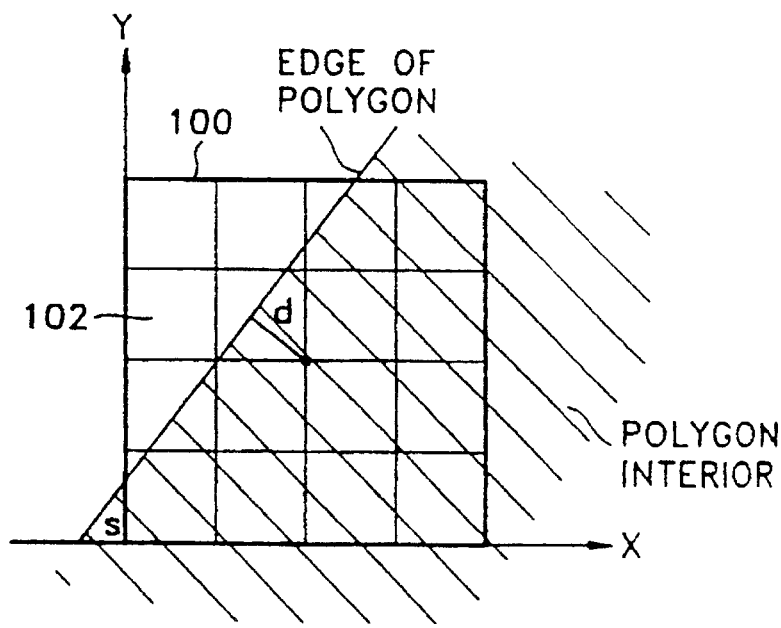
FIG. 1A shows a screen unit and polygon edge used in the present invention.
Figure 1B:
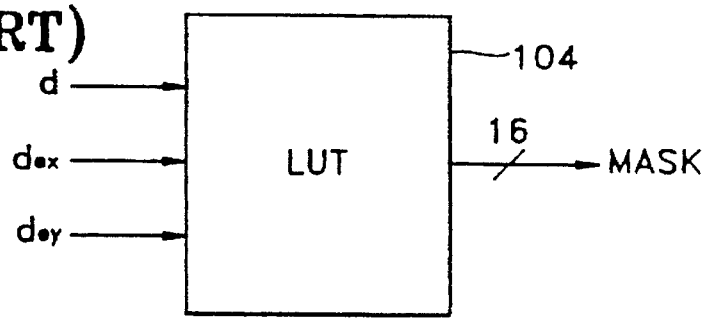
FIG. 1B is a schematic block diagram of the conventional look-up table for generating a pixel mask.
Figure 1C:
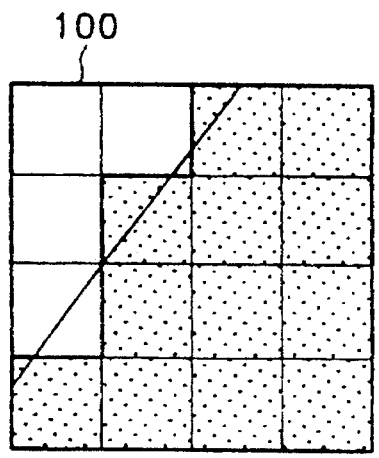
FIG. 1C shows a screen of a pixel generated by a mask.
Figure 2A:
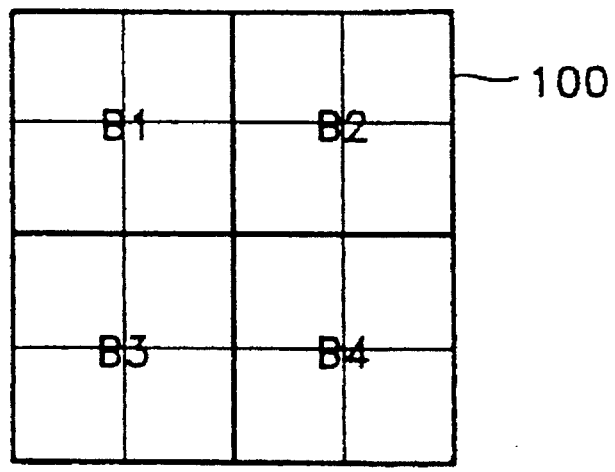
FIG. 2A shows how to process the pixel shown in FIG. 1A according to the present invention.

As shown in FIG. 2A, since the pixel 100 is processed by being divided into four sub-blocks B1, B2, B3 and B4, the LUT is also divided into four partitions for processing in parallel.

Figure 2B:
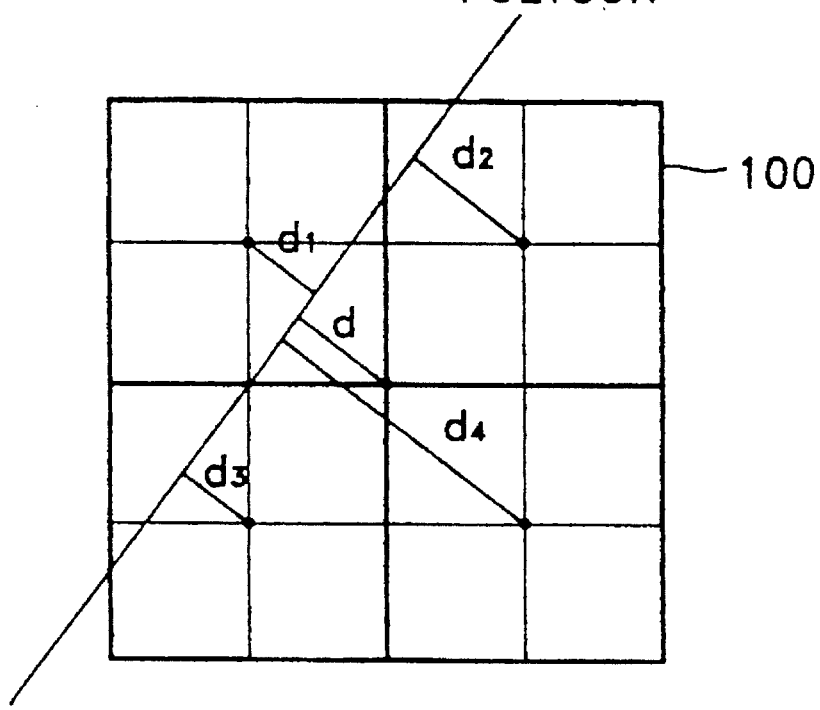
FIG. 2B shows the distances from the centers of the respective sub-blocks to a straight line of the edge of the polygon.

FIG. 2B shows the distances from the centers of the respective sub-blocks to the straight line of a polygon edge.

Therefore, since four independent LUTs are used with respect to one pixel in the present invention, the distances d1, d2, d3 and d4 from the centers of the sub-blocks B1, B2, B3 and B4 corresponding to the respective LUTs to the straight line of a polygonal edge can be obtained by respectively adding the distance (d) from the center of pixel 100 to the straight line of polygonal edge with the $\Delta d_1$, $\Delta d_2$, $\Delta d_3$ and $\Delta d_4$, which are defined as follows:

$$\Delta d_1 = \frac{-d_{ex}}{4} + \frac{d_{ey}}{4} \qquad \text{Eq. (1)}$$

$$\Delta d_2 = \frac{d_{ex}}{4} + \frac{d_{ey}}{4} \qquad \text{Eq. (2)}$$

$$\Delta d_3 = \frac{-d_{ex}}{4} - \frac{d_{ey}}{4} \qquad \text{Eq. (3)}$$

$$\Delta d_4 = \frac{d_{ex}}{4} - \frac{d_{ey}}{4} \qquad \text{Eq. (4)}$$

where $d_{ex}$ is equal to $\Delta d/\Delta x$ and $d_{ey}$ is equal to $\Delta d/\Delta y$.

In other words, since the distance (d) is obtained by the interpolation of $\Delta d/\Delta x$ and $\Delta d/\Delta y$, $\Delta d_1$, $\Delta d_2$, $\Delta d_3$ and $\Delta d_4$ are defined as above and stored in registers.

Figure 3:
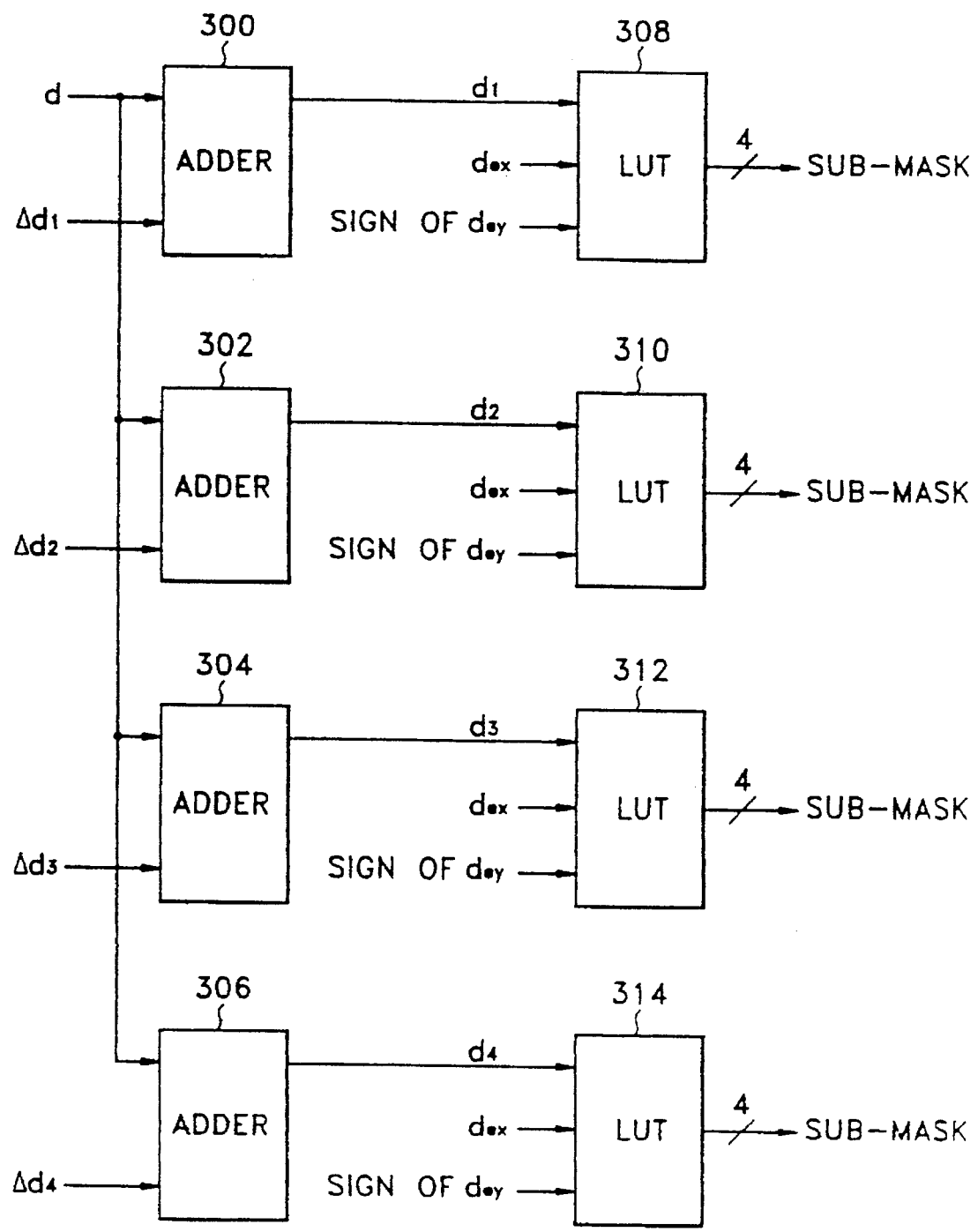
FIG. 3 is a schematic block diagram of the apparatus for implementing the method according to the present invention.

FIG. 3 is a schematic block diagram of the apparatus for implementing the method according to the present invention and the apparatus is constituted by first to fourth adders 300, 302, 304 and 306 and first to fourth LUTs 308, 310, 312 and 314.

The operation according to the above configuration will now be described.

First adder 300 receives d and $\Delta d_1$ and adds them, thereby outputting d1 to first LUT 308, second adder 302 receives d and $\Delta d_2$ and adds them, thereby outputting d2 to second LUT 310, third adder 304 receives d and $\Delta d_3$ and adds them, thereby outputting d3 to third LUT 312, and fourth adder 306 receives d and $\Delta d_4$ and adds them, thereby outputting d4 to fourth LUT 314.

The respective LUTs 308, 310, 312 and 314 apply d1 to d4, $d_{ex}$ and the sign of $d_{ey}$ as their inputs as conventionally and generate sub-masks for the respective sub-blocks.

The present invention has an effect of diminishing the size of LUT by 1/16 by dividing LUT memory into four. In order to obtain an independent sub-mask, four adders 300, 302, 304 and 306 are required for obtaining the distance from the centers of the respective sub-blocks to the straight line of polygonal edge, which may delay operation by one clock. Also, error of the maximum 1/16 pixel may be produced due to accumulation of truncation error in the respective sub-blocks by calculating the area covered by the polygon within a pixel by four independent sub-blocks.

However, such an error is insignificant in a visual effect of color of a pixel. Also, one clock delayed processing speed is insignificant compared to the total time required for shading by the area sampling method.

Given that the number of samplings n×n ($n^2$) is expressed as m, the total LUT size is defined by the following equation:

$$2m \times m \times 4 \times m = 8m^3 \qquad \text{Eq. (5)}$$

where the first term (2m) is the number of cases d expressed in half-subpixel units, the second term (m) is the number of cases of slopes, the third term (4) is the number of cases by signs of $d_{ey}$ and $d_{ex}$, and the fourth term (m) is the number of sub-pixels.

Therefore, in the present invention, since four partitioned LUTs in which the sampling number is reduced to one-fourth are used by dividing an LUT into four partitions, the required LUT memory capacity can be reduced to one-sixteenth of the conventional size.

Also, in the case of 8×8 samplings, if the division by sixteen of the LUT is applied recursively until the sub-blocks become 2×2 samplings, the size of LUT can be diminished to $1/16^2$. At this time, the deeper the recursive depth becomes, the more registers and adders are required in proportion thereto. Thus, assuming a recursive depth of k, the size of LUT is $1/16^k$.

What is claimed is:

1. An anti-aliasing method using a partitioned LUT having sub-LUTs; the method comprising the steps of:

dividing a pixel into four sub-blocks; obtaining a sub-block distance for each sub-block from the center of each of said four sub-blocks to a straight line of the edge of a predetermined polygon, using a pixel distance from the center of said pixel to said straight line and the slope of said straight line; and respectively generating sub-masks stored in said sub-LUTs for the respective sub-blocks by inputting the respective sub-block distances and said slope, to said sub-LUTs.

2. An anti-aliasing method using partitioned LUTs as claimed in claim 1, wherein said sub-block distance obtaining step is performed by adding said pixel distance with the respective four sub-block distance estimated values defined in the following equations, $$\Delta d_1 = \frac{-d_{ex}}{4} + \frac{d_{ey}}{4}$$

$$\Delta d_2 = \frac{d_{ex}}{4} + \frac{d_{ey}}{4}$$

$$\Delta d_3 = \frac{-d_{ex}}{4} - \frac{d_{ey}}{4}$$

$$\Delta d_4 = \frac{d_{ex}}{4} - \frac{d_{ey}}{4}$$

where $\Delta d_1$, $\Delta d_2$, $\Delta d_3$, and $\Delta d_4$ are first through fourth estimated values of sub-block distances, $d_{ex}$ is the pixel distance depending on the increment of the X axis, and $d_{ey}$ is the pixel distance depending on the increment of the Y axis.

3. An anti-aliasing method using a partitioned LUT as claimed in claim 2, wherein said sub-mask generating step comprises of the steps of:

obtaining a first sub-mask from a predetermined first sub-LUT which receives said $d_{ex}$, the sign of said $d_{ey}$ value, and a first sub-block distance obtained by adding said pixel distance with said first estimated values of sub-block distance;

obtaining a second sub-mask from a predetermined second sub-LUT which receives said $d_{ex}$, the sign of said $d_{ey}$ value, and a second sub-block distance obtained by adding said pixel distance with said second estimated values of sub-block distance;

obtaining a third sub-mask from a predetermined third sub-LUT which receives said $d_{ex}$, the sign of said $d_{ey}$ value, and a third sub-block distance obtained by adding said pixel distance with said third estimated values of sub-block distance; and obtaining a fourth sub-mask from a predetermined fourth sub-LUT which receives said $d_{ex}$, the sign of said $d_{ey}$ value, and a fourth sub-block distance obtained by adding said pixel distance with said fourth estimated values of sub-block distance.

4. An anti-aliasing method using a partitioned LUT as claimed in claim 3, wherein each of said first to fourth sub-LUTs receive the sign of said $d_{ex}$ value and said $d_{ey}$ value, instead of said $d_{ex}$ and the sign of said $d_{ey}$.

5. An anti-aliasing apparatus for use in an electronic graphics system wherein each pixel is divided into a plurality of sub-blocks, the apparatus comprising:

a plurality of distance determining means, one for each respective sub-block, for obtaining a sub-block distance for each sub-block from the center of the respective sub-block to a straight line of an edge of a predetermined polygon, using a pixel distance from the center of said pixel to said straight line and the slope of said straight line;

a plurality of sub-mask generating means, one for each respective sub-block, for generating a sub-mask for the respective sub-block and coupled to the respective distance determining means to receive the respective sub-block distance, said sub-mask being generated using the respective sub-block distance and said slope.

* * * * *